United States Patent
Lei et al.

(10) Patent No.: US 9,420,501 B2
(45) Date of Patent: Aug. 16, 2016

(54) METHOD AND APPARATUS FOR HANDOVER IN HETEROGENEOUS SYSTEM

(71) Applicant: Nokia Technologies Oy, Espoo (FI)

(72) Inventors: Yixue Lei, Beijing (CN); Haitao Li, Beijing (CN); Kodo Shu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/443,629

(22) PCT Filed: Nov. 30, 2012

(86) PCT No.: PCT/CN2012/085623
§ 371 (c)(1),
(2) Date: May 18, 2015

(87) PCT Pub. No.: WO2014/082282
PCT Pub. Date: Jun. 5, 2014

(65) Prior Publication Data
US 2015/0312811 A1    Oct. 29, 2015

(51) Int. Cl.
*H04W 36/38* (2009.01)
*H04W 36/00* (2009.01)

(52) U.S. Cl.
CPC .......... *H04W 36/0055* (2013.01); *H04W 36/38* (2013.01)

(58) Field of Classification Search
None
See application file for complete search history.

(56) References Cited

U.S. PATENT DOCUMENTS

| | | | | |
|---|---|---|---|---|
| 9,326,211 B2 * | 4/2016 | Kaur | ................ | H04W 36/0072 |
| 2008/0176569 A1 * | 7/2008 | Jung | ................ | H04W 36/0066 455/436 |
| 2010/0046477 A1 * | 2/2010 | Marin | ................ | H04W 36/0072 370/332 |
| 2011/0019609 A1 * | 1/2011 | Zhong | ................ | H04L 12/4633 370/315 |
| 2013/0053048 A1 * | 2/2013 | Garcia | ................ | H04L 12/5692 455/450 |
| 2014/0362691 A1 * | 12/2014 | Lei | ................ | H04W 48/18 370/230 |
| 2015/0055620 A1 * | 2/2015 | Vesterinen | ............ | H04W 36/18 370/331 |
| 2015/0063091 A1 * | 3/2015 | Vesterinen | .......... | H04W 76/028 370/216 |
| 2015/0282239 A1 * | 10/2015 | Han | .................... | H04W 76/025 370/329 |

FOREIGN PATENT DOCUMENTS

| | | |
|---|---|---|
| CN | 101483900 A | 7/2009 |
| CN | 102124779 A | 7/2011 |
| KR | 20110070389 A | 6/2011 |
| WO | 2013/123643 A1 | 8/2013 |

OTHER PUBLICATIONS

International Search Report and Written Opinion received for corresponding Patent Cooperation Treaty Application No. PCT/CN2012/085623, dated Sep. 5, 2013, 11 pages.

* cited by examiner

*Primary Examiner* — Hassan Kizou
*Assistant Examiner* — Hashim Bhatti
(74) *Attorney, Agent, or Firm* — Nokia Technologies Oy

(57) ABSTRACT

Embodiments of the disclosure provide methods and apparatuses for handover in a heterogeneous network. According to the method, a candidate radio connectivity mode for use after handover from a source BS to a first target BS and/or a second target BS is determined; a first handover related message which comprises the candidate radio connectivity mode is sent to the source BS; and in response to receiving a second handover related message, the first target BS and/or the second target BS may be accessed, wherein the source BS is not associated with the first target BS, and wherein the first target BS is a LPN and is associated with the second target BS.

18 Claims, 9 Drawing Sheets

METHOD AND APPARATUS FOR HANDOVER IN HETEROGENEOUS SYSTEM

RELATED APPLICATION

This application was originally filed as Patent Cooperation Treaty Application No. PCT/CN2012/085623 filed Nov. 30, 2012.

FIELD OF THE INVENTION

Embodiments of the present invention generally relate to communication techniques. More particularly, embodiments of the present invention relate to a method and apparatus for handover from a source node to a target node which is not associated with the source node in a heterogeneous network.

BACKGROUND OF THE INVENTION

Enhanced Local Area (eLA) solution aims to design a local area system providing high performance on peak data rate, cell capacity, quality of service (QoS) guarantee, interference management, etc. Low cost and high energy efficiency are also expected for the eLA system. A base station (BS) is located in a radio access network (RAN) side which provides the local area network, just like home enhanced node-B (HeNB) in the LTE system, which is sometimes referred to as low power node (LPN) or eLA AP (access point) hereafter. User equipment (UE) maintains two connections with macro-eNB and LPN, which are called "dual radio connections". A macro network connection is more stable and more carefully managed so that UE does not easily lose its connection, while a eLA connection is there more like for providing high speed data service in the local area.

The eLA system is expected to provide high performance service for users, with low cost, and is expected to become a competitor to Wi-Fi.

In current eLA architecture and protocol concept, it is a challenge of effective and efficient handover from source eNB towards a LPN (such as an eLA access point (AP)) which is not associated with the source eNB, e.g., the eLA AP has no simplified or modified S1 interface with the source eNB. Such handover may for example comprise handover from a source macro eNB to an eLA AP which is associated and thus controlled by another macro eNB and is not associated with the source macro eNB. For another example, in the case that a user equipment (UE) is served by a source eLA AP controlled by a first macro eNB and is going to handover to a target eLA AP controlled by a second macro eNB, wherein there is no association between the two eLA APs, effective and efficient processes of the handover are also expected.

According to existing schemes, to enable a UE handover from a macro eNB to an unassociated target eLA AP, a straight forward approach is to conduct an X2-based handover from source macro eNB to a macro eNB which controls the target eLA AP, and then conduct a separated macro eNB to eLA AP offloading. In other words, the UE is not handed over directly to the target eLA AP.

Since the existing scheme changes radio connectivity modes (single to dual connectivity radio or dual to single connectivity radio) via separated on-loading and offloading procedures, undesired signaling overhead, service interruption, QoS degradation, and the like are introduced.

In view of the foregoing problem, there is a need to design a solution for handover the UE between unassociated nodes in a heterogeneous network, so as to improve service continuity, reduce signaling overhead, increase signal quality and improve load balance in the heterogeneous network.

SUMMARY OF THE INVENTION

The present invention proposes a solution for handover a UE between unassociated nodes in a heterogeneous network, so as to improve service continuity, reduce signaling overhead, increase signal quality and improve load balance in the heterogeneous network.

According to a first aspect of embodiments of the present invention, embodiments of the invention provide a method for handover in a communication system. The method may comprise: determining a candidate radio connectivity mode for use after handover from a source BS to a first target BS and/or a second target BS; sending to the source BS a first handover related message which comprises the candidate radio connectivity mode; and in response to receiving a second handover related message, accessing the first target BS and/or the second target BS, wherein the source BS is not associated with the first target BS, and wherein the first target BS is a LPN and is associated with the second target BS.

According to a second aspect of embodiments of the present invention, embodiments of the invention provide a method for handover in a communication system. The method may comprise: in response to receiving from a UE a first handover related message comprising a candidate radio connectivity mode, which is for use after handover from a source BS to a first target BS and/or a second target BS, transmitting the handover request to the second target BS; and in response to receiving an acknowledgement of the handover request, sending a second handover related message to the UE, wherein the source BS is not associated with the first target BS, and wherein the first target BS is a LPN and is associated with the second target BS.

According to a third aspect of embodiments of the present invention, embodiments of the invention provide a method for handover in a communication system. The method may comprise: in response to receiving a first handover request comprising a candidate radio connectivity mode, which is for use after handover from a source BS to a first target BS and/or a second target BS, sending a second handover request to the first target BS; and in response to receiving from the first target BS a response to the second handover request, transmitting an acknowledgement of the first handover request, wherein the source BS is not associated with the first target BS, and wherein the first target BS is a LPN and is associated with the second target BS.

According to a fourth aspect of embodiments of the present invention, embodiments of the invention provide a method for handover in a communication system. The method may comprise: in response to receiving a second handover request from a second target BS, performing radio resource configuration to obtain UE configuration of a first target BS, wherein the second handover request is sent by the second target BS in response to receiving a first handover request which comprises a candidate radio connectivity mode for use after handover from a source BS to the first target BS and/or the second target BS; and sending to the second target BS a response to the second handover request, wherein the response to the second handover request comprises the UE configuration of the first target BS, wherein the source BS is not associated with the first target BS, and wherein the first target BS is a LPN and is associated with the second target BS.

According to a fifth aspect of embodiments of the present invention, embodiments of the invention provide an apparatus for handover in a communication system. The apparatus may comprise: a determinator configured to determine a candidate radio connectivity mode for use after handover from a source BS to a first target BS and/or a second target BS; a first sender configured to send to the source BS a first handover related message which comprises the candidate radio connectivity mode; and a handler configured to, in response to receiving a second handover related message, access the first target BS and/or the second target BS, wherein the source BS is not associated with the first target BS, and wherein the first target BS is a LPN and is associated with the second target BS.

According to a sixth aspect of embodiments of the present invention, embodiments of the invention provide an apparatus for handover in a communication system. The apparatus may comprise: a first transmitter configured to, in response to receiving from a UE a first handover related message comprising a candidate radio connectivity mode, which is for use after handover from a source BS to a first target BS and/or a second target BS, transmit the handover request to the second target BS; and a second sender configured to, in response to receiving an acknowledgement of the handover request, send a second handover related message to the UE, wherein the source BS is not associated with the first target BS, and wherein the first target BS is a LPN and is associated with the second target BS.

According to a seventh aspect of embodiments of the present invention, embodiments of the invention provide an apparatus for handover in a communication system. The apparatus may comprise: a third sender configured to, in response to receiving a first handover request comprising a candidate radio connectivity mode, which is for use after handover from a source BS to a first target BS and/or a second target BS, send a second handover request to the first target BS; and a second transmitter configured to, in response to receiving from the first target BS a response to the second handover request, transmit an acknowledgement of the first handover request, wherein the source BS is not associated with the first target BS, and wherein the first target BS is a LPN and is associated with the second target BS.

According to an eighth aspect of embodiments of the present invention, embodiments of the invention provide an apparatus for handover in a communication system. The apparatus may comprise: a performer configured to, in response to receiving a second handover request from a second target BS, perform radio resource configuration to obtain UE configuration of a first target BS, wherein the second handover request is sent by the second target BS in response to receiving a first handover request which comprises a candidate radio connectivity mode for use after handover from a source BS to the first target BS and/or the second target BS; and a fourth sender configured to send to the second target BS a response to the second handover request, wherein the response to the second handover request comprises the UE configuration of the first target BS, wherein the source BS is not associated with the first target BS, and wherein the first target BS is a LPN and is associated with the second target BS.

According to a ninth aspect of embodiments of the present invention, embodiments of the invention provide an apparatus for handover in a communication system. The apparatus may comprise: at least one processor; and at least one memory including compute program instructions, wherein the at least one memory and computer program instructions are configured to, with the at least one processor, cause the apparatus at least to: determine a candidate radio connectivity mode for use after handover from a source BS to a first target BS and/or a second target BS; send to the source BS a first handover related message which comprises the candidate radio connectivity mode; and in response to receiving a second handover related message from the source BS, access the first target BS and/or the second target BS, wherein the source BS is not associated with the first target BS, and wherein the first target BS is a LPN and is associated with the second target BS.

According to a tenth aspect of embodiments of the present invention, embodiments of the invention provide an apparatus for handover in a communication system. The apparatus may comprise: at least one processor; and at least one memory including compute program instructions, wherein the at least one memory and computer program instructions are configured to, with the at least one processor, cause the apparatus at least to: in response to receiving from a UE a first handover related message comprising a candidate radio connectivity mode, which is for use after handover from a source BS to a first target BS and/or a second target BS, transmit the handover request to the second target BS; and in response to receiving an acknowledgement of the handover request, send a second handover related message to the UE, wherein the source BS is not associated with the first target BS, and wherein the first target BS is a LPN and is associated with the second target BS.

According to an eleventh aspect of embodiments of the present invention, embodiments of the invention provide an apparatus for handover in a communication system. The apparatus may comprise: at least one processor; and at least one memory including compute program instructions, wherein the at least one memory and computer program instructions are configured to, with the at least one processor, cause the apparatus at least to: in response to receiving a first handover request comprising a candidate radio connectivity mode, which is for use after handover from a source BS to a first target BS and/or a second target BS, send a second handover request to the first target BS; and in response to receiving from the first target BS a response to the second handover request, transmit an acknowledgement of the first handover request, wherein the source BS is not associated with the first target BS, and wherein the first target BS is a LPN and is associated with the second target BS.

According to a twelfth aspect of embodiments of the present invention, embodiments of the invention provide an apparatus for handover in a communication system. The apparatus may comprise: at least one processor; and at least one memory including compute program instructions, wherein the at least one memory and computer program instructions are configured to, with the at least one processor, cause the apparatus at least to: in response to receiving a second handover request from a second target BS, perform radio resource configuration to obtain UE configuration of a first target BS, wherein the second handover request is sent by the second target BS in response to receiving a first handover request which comprises a candidate radio connectivity mode for use after handover from a source BS to the first target BS and/or the second target BS; and send to the second target BS a response to the second handover request, wherein the response to the second handover request comprises the UE configuration of the first target BS, wherein the source BS is not associated with the first target BS, and wherein the first target BS is a LPN and is associated with the second target BS.

In an embodiment, a computer program product comprising at least one computer readable storage medium having a computer readable program code portion stored thereon is provided. The computer readable program code portion may comprise: program code instructions for performing the method according to the first aspect of embodiments of the present invention.

In another embodiment, a computer program product comprising at least one computer readable storage medium having a computer readable program code portion stored thereon is provided. The computer readable program code portion may comprise: program code instructions for performing the method according to the second aspect of embodiments of the present invention.

In yet another embodiment, a computer program product comprising at least one computer readable storage medium having a computer readable program code portion stored thereon is provided. The computer readable program code portion may comprise: program code instructions for performing the method according to the third aspect of embodiments of the present invention.

In a further embodiment, a computer program product comprising at least one computer readable storage medium having a computer readable program code portion stored thereon is provided. The computer readable program code portion may comprise: program code instructions for performing the method according to the fourth aspect of embodiments of the present invention.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1A:
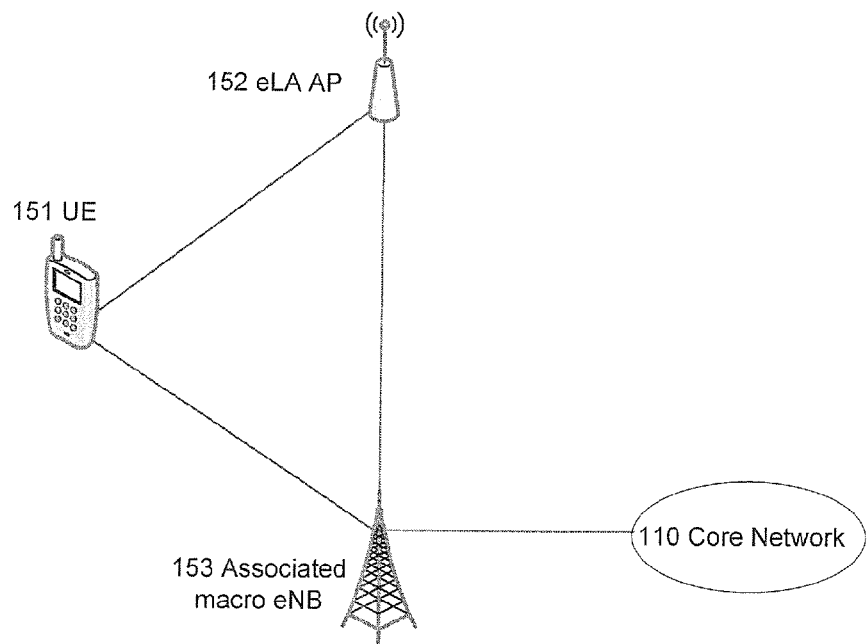
FIG. 1A illustrates an eLA network architecture according to embodiments of the invention.

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

A base station (BS) may refer to a node B (NodeB), an evolved NodeB (eNodeB), a Base Transceiver Station (BTS), an Access Point (AP) or a Radio Access Station (RAS), and some or all of the functions of the BS, the NodeB, the eNodeB, the BTS, the AP and the RAS may be included. A BS may be a macro BS (e.g., macro eNB) or a low power node (LPN).

A LPN may refer to a micro, pico, Remote Radio Head (RRH), relay, femto, home BS or any other suitable device. The LPN may be distributed in the coverage of a macro BS in a heterogeneous network (HetNet) which provides a mosaic of coverage, with handoff capability between network elements.

Embodiments of the present invention provide a method and apparatus for handover a UE from a source BS to a first target BS and/or a second target BS in a heterogeneous network according to embodiments of the invention. As further discussed below, in some embodiments, the heterogeneous network at least comprises a UE, a source BS serving the UE, a first target BS, and a second target BS associated with the first target BS. The first target BS may be a LPN and the second target BS may be a macro eNB which controls the first target BS, and the source BS is not associated with the first target BS. When the UE is moving away from the coverage of the source BS, a candidate radio connectivity mode for use after handover to a target BS and notify the source BS may be determined, then a handover request comprising the candidate radio connectivity mode may be sent to the target BS(s) from the source BS. In the case that the UE prefers to employ a single mode after the handover, it may access either the first target BS or the second BS upon being notified that the handover request has been acknowledged. In the case that the UE prefers to employ a dual mode after the handover, it may access both the first target BS and the second BS upon being notified that the handover request has been acknowledged. As such, the handover procedures may be performed together with change of radio connectivity modes, and separated on-loading and offloading procedures are no longer involved as before. Now some exemplary embodiments of the present invention will be described below with reference to the figures.

Reference is first made to FIG. 1A, which illustrates an eLA network architecture with exemplary network entities and interfaces between these entities.

The illustrated eLA network comprises a UE 151, an eLA AP 152 and associated macro eNB 153. The UE 151 may be served by the associated macro eNB 153. When the UE 151 requests for the eLA service of an eLA AP 152, it may be identified and authorized in the eLA network. An exemplary embodiment enables supporting a single/dual radio connectivity mode to offload macro network resources to use eLA network resources. When the single radio connectivity mode is applied, the UE 151 may be served by either the eLA AP 152 or the associated macro eNB 153. Further, when the dual radio connectivity mode is applied, the UE 151 may be served by both the eLA AP 152 and the associated macro eNB 153.

Figure 1B:
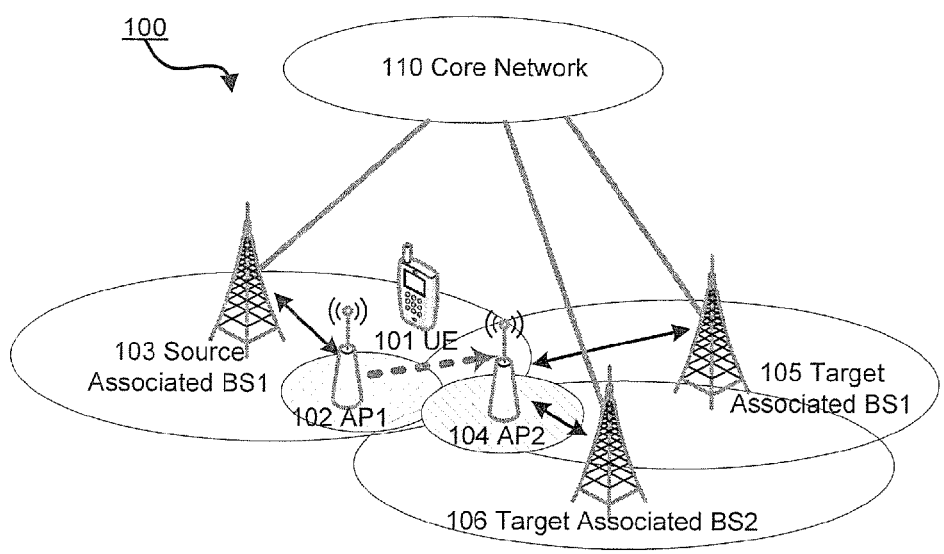
FIG. 1B illustrates a schematic diagram of a heterogeneous network 100 according to embodiments of the invention.

Reference is first made to FIG. 1B, which illustrates a schematic diagram of a heterogeneous network 100 according to embodiments of the invention.

As shown in FIG. 1B, the heterogeneous network 100 comprises a UE 101, an AP1 102, a source associated BS1 103, an AP2 104, a target associated BS1 105 and a target associated BS2 106. In the illustrated heterogeneous network 100, the AP1 102 is a LPN and the source associated BS1 103 is a macro eNB associated with the AP1 102. The AP2 104 is also a LPN and both of the target associated BS1 105 and target associated BS2 106 are macro eNBs associated with the AP2 104.

It is to be noted that, in addition to target associated BS1 105 and target associated BS2 106, there may be multiple macro eNBs associated with the AP2 104, which are not shown explicitly for purpose of briefness. It is to be understood that FIG. 1 shows two macro eNBs (target associated BS1 105 and target associated BS2 106) associated with AP2 104 for illustration, rather than limitation. It is further to be noted that the target associated BS1 105 and target associated BS2 106 may have identifiers, for example, eNB ID1 and eNB ID2. During the handover, the UE may acquire the identifiers of the target associated BSs according to parameters broadcasted from its serving BS. In the illustrated embodiments, the UE may acquire identifiers of target associated BS1 105 and target associated BS2 106. As such, the UE 101 may use eNB ID1 and eNB ID2 to identify the macro eNBs associated with AP2 104. Before handover, UE may select one target associated BS according to the measured signaling strength of macro cells. Macro cells with the eNB ID1 and eNB ID2 can be prioritized during the measurement.

According to embodiments of the present invention, Macro eNBs in the network 100, such as source associated BS1 103, the target associated BS1 105 and the target associated BS2 106, may connect, via a legacy S1 interface (also referred to as a connection 802), to one or more elements of core network 110, such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR).

During handover of the UE 101, the UE may provide a preference for a radio connectivity mode to be used after the handover, which is referred to as a candidate radio connectivity mode. In some embodiments, the candidate radio connectivity mode is a single radio connectivity mode (sometimes called "single mode"), thus upon receiving acknowledgement of the handover request, the UE may access either the first target BS (e.g., AP2 104) or the second target BS (target associated BS1 105, target associated BS2 106, or some other macro eNB which is associated with AP2 104 and is not shown in FIG. 1B). In some embodiments, the candidate radio connectivity mode is a dual radio connectivity mode (sometimes called "dual mode"), thus upon receiving acknowledgement of the handover request, the UE may access both the first target BS and the second target BS.

In embodiments illustrated with FIG. 1B, the source BS is AP1 102, and the target BS is AP2 104, in which the UE 101 is handed over from the AP1 102 to the AP2 104.

According to embodiments of the present invention, the handover is not limited to the concrete scenario shown in FIG. 1B. In other embodiments of the present invention, the source BS may be a macro eNB, e.g., source associated BS1 103, instead of AP1 102 shown in FIG. 1B. In such cases, the UE is being served by the macro eNB 103 and moving away from it to target BS(s). In some embodiments, the target BS(s) may be AP2 104, target associated BS1 105 or both of them. In some other embodiments, the target BS(s) may be AP2 104, target associated BS2 106 or both of them. In other words, the UE may be handed over from the macro eNB 103 to a target AP and/or a target macro BS.

It is to be noted that in the following description, for purpose of briefness, the target associated BS1 105 is sometimes exemplified as the second target BS. And it should be understood that in other embodiments of the present invention, the target associated BS2 106 or other macro eNB which is associated with a target AP may also be used as the second target BS.

Figure 2:
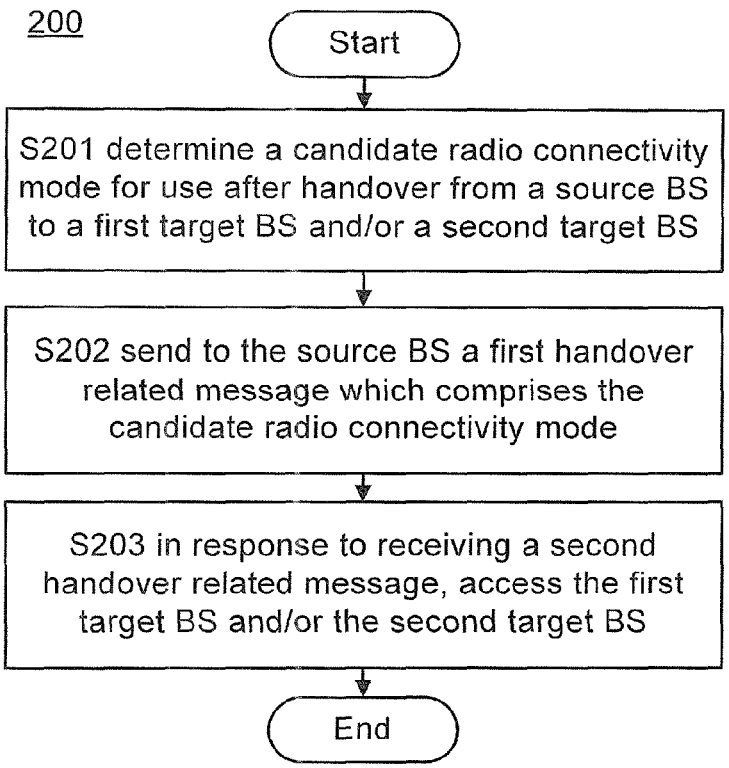
FIG. 2 illustrates a flow chart of a method 200 for handover a UE from a source BS to a first target BS and/or a second target BS in a heterogeneous network according to embodiments of the invention, wherein the method 200 may be performed at the UE.

Reference is now made to FIG. 2, which illustrates a flow chart of a method 200 for handover a UE from a source BS to a first target BS and/or a second target BS in a heterogeneous network according to embodiments of the invention, wherein the method 200 may be performed at the UE. According to embodiments of the present invention, the source BS is not associated with the first target BS, and the first target BS is a LPN and is associated with the second target BS. In accordance with embodiments of the present invention, the method 200 may be carried out by, for example, a UE, a terminal, a mobile station or similar devices.

In accordance with embodiments of the present invention, the source BS is not associated with the first target BS means that the source BS does not have a logical interface with the first target BS. The logical interface may comprise a simplified S1 interface, a legacy S1 interface, and other suitable logical interface. Further, the first target BS has a logical interface with the second target BS, thus, the first target BS has a logical interface, such as simplified S1 interface and a legacy S1 interface, with the second target BS. In embodiments of the present invention, the first target BS may be AP2 104 shown in FIG. 1B and the second target BS may be target associated BS1 105 which controls the AP2 104.

At step S201, a candidate radio connectivity mode for use after handover from a source BS to a first target BS and/or a second target BS is determined.

In accordance with embodiments of the present invention, the candidate radio connectivity mode may be obtained in several ways. For example, a preference on radio connectivity modes may be generated as the candidate radio connectivity mode by considering factors such as power consumption information, UE mobility states, bandwidth requirements, local service needs, QoS requirements, and so on.

After UE acquires the eNB identification (ID) list broadcasted by an AP serving the UE, it may compare the eNB ID in the list with its discovered neighboring macro cells, prioritize the measurement the associated macro cell (with the same eNB ID as broadcasted) and selectively report to serving AP/eNB. UE may indicate the acquired eNB ID to serving AP/eNB and serving AP/eNB conduct measurement control to prioritize the measurement of certain macro cells.

According to power consumption information, UE mobility states, local service needs and bandwidth requirements, UE may generate its preference on single/dual modes in a target side. It is to be noted that the single/dual mode preference is also referred to as the "candidate radio connectivity mode" and is different from single/dual radio capability. The preferences may be generated according to several factors. For example, dual radio means higher power consumption for a UE. For a UE in high mobility, it may neglect small cells and preferably select single radio macro mode in the target side. Further, large bandwidth needs small cell layer to conduct offloading, while small bandwidth and high QoS requirement may be more suitable for macro cell.

Local service is a factor to be considered when deriving the preference radio connectivity mode. As local service is only provided by a target LPN, if UE has potential local service needs during radio connectivity mode selection, target LPN should be preferred. Otherwise, local service may not be provided.

According to exemplary embodiments, via RRC signaling, the UE may indicate its preference about single or dual radio mode considering power consumption, mobility speed or bandwidth requirement to serving AP or eNB.

In accordance with embodiments of the present invention, the candidate radio connectivity mode may be a single radio connectivity mode or a dual radio connectivity mode. In accordance with embodiments of the present invention, the first target BS may be controlled by a second target BS via association between the first target BS and the second target BS. According to exemplary embodiments, the first handover related message is an enhanced measurement report.

At step S202, a first handover related message which comprises the candidate radio connectivity mode is sent to the source BS.

The first handover related message may comprise a local cell identifier of the first target BS. In local area, the cell identifier broadcasted by AP for handover. The local cell identifier may be used to route handover request from second target BS to the first target BS, e.g, send the handover request from target associated BS1 105 to AP2 104 as shown in FIG. 1B. In embodiments of the present invention, the local cell identifier may be a target AP's local cell identifier. Multiple local cell identifiers may be mapped into one local cell identifier (e.g., virtual E-CGI) with left 20 bits same as macro eNB. Thus, from EPC sides, these eLA cells are regarded as a cell under one macro eNB.

In accordance with embodiments of the present invention, besides the candidate radio connectivity mode and the local cell identifier of the first target BS, the first handover related message may further comprise other suitable information, such as identification(s) of macro eNB(s) that associated with the first target BS.

At step S203, in response to receiving a second handover related message, the first target BS and/or the second target BS is accessed.

In accordance with embodiments of the present invention, the second handover related message may comprise UE configuration of the first target BS and/or UE configuration of the second target BS. The contents of UE configuration may include the required parameters for UE to establish radio connectivity with target AP and/or eNB including C-RNTI, dedicated RACH code etc.

The handover related message may be received directly or indirectly from the source BS. For example, the source BS may be a macro eNB and may send the second handover related message to the UE, thus the second handover related message may be received by the UE directly from the source BS. For another example, the source BS may be an AP/LPN and the second handover related message may be received by the UE from a source associated BS (a macro eNB) which is associated with the source BS.

Figure 3:
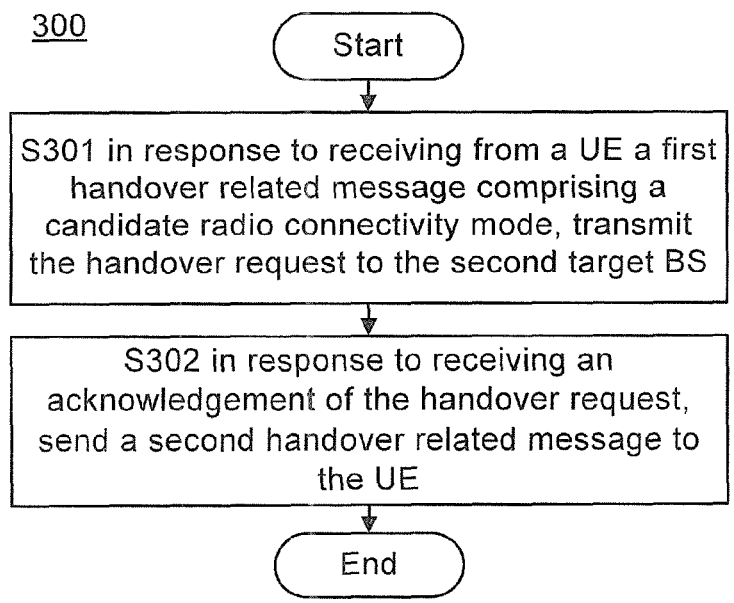
FIG. 3 illustrates a flow chart of a method 300 for handover a UE from a source BS to a first target BS and/or a second target BS in a heterogeneous network according to embodiments of the invention, wherein the method 300 may be performed at the source BS.

Reference is now made to FIG. 3, which illustrates a flow chart of a method 300 for handover a UE from a source BS to a first target BS and/or a second target BS in a heterogeneous network according to embodiments of the invention, wherein the method 300 may be performed at the source BS. According to embodiments of the present invention, the source BS is not associated with the first target BS, and the first target BS is a LPN and is associated with the second target BS. In accordance with embodiments of the present invention, the method 300 may be carried out by a source BS. The source BS, in some embodiments, may be a macro eNB. In some other embodiments, the source BS may be a LPN, such as a pico eNB, a femto eNB, or a home BS which is associated with a macro eNB (e.g., controlled by the macro eNB).

At step S301, in response to receiving from a UE a first handover related message comprising a candidate radio connectivity mode, the handover request is transmitted to the second target BS.

The first handover related message here is similar to that mentioned in step S202, which may also comprise a candidate radio connectivity mode and a local cell identifier of the first target BS. In further embodiments of the present invention, the first handover related message may further comprise identification(s) of macro eNB(s) that associated with the first target BS and other suitable information.

According to exemplary embodiments, the first handover related message is an enhanced measurement report.

According to embodiments of the present invention, the source BS may be a LPN, e.g., AP1 102 as shown in FIG. 1B. The source BS may be associated with a source associated BS. In particular, the source associated BS may control or manage the source BS. As such, the first handover related message may be first transmitted to the source associated BS, such that the source associated BS transmits the handover request to the second target BS.

At step S302, in response to receiving an acknowledgement of the handover request, a second handover related message is sent to the UE.

The second handover related message is similar to that received at step S203 of method 200. In other words, upon receiving an acknowledgement of its handover request, the source BS will send a second handover related message to the UE at step S302, which is the second handover related message received by the UE at step S203.

In exemplary implementations, the second handover related message may be RRCConnectionReconfiguration.

In accordance with embodiments of the present invention, the second handover related message may comprise UE configuration of the first target BS and/or UE configuration of the second target BS. The contents of UE configuration may include the required parameters for UE to establish radio connectivity with target AP and/or eNB including C-RNTI, dedicated RACH code etc.

Figure 4:
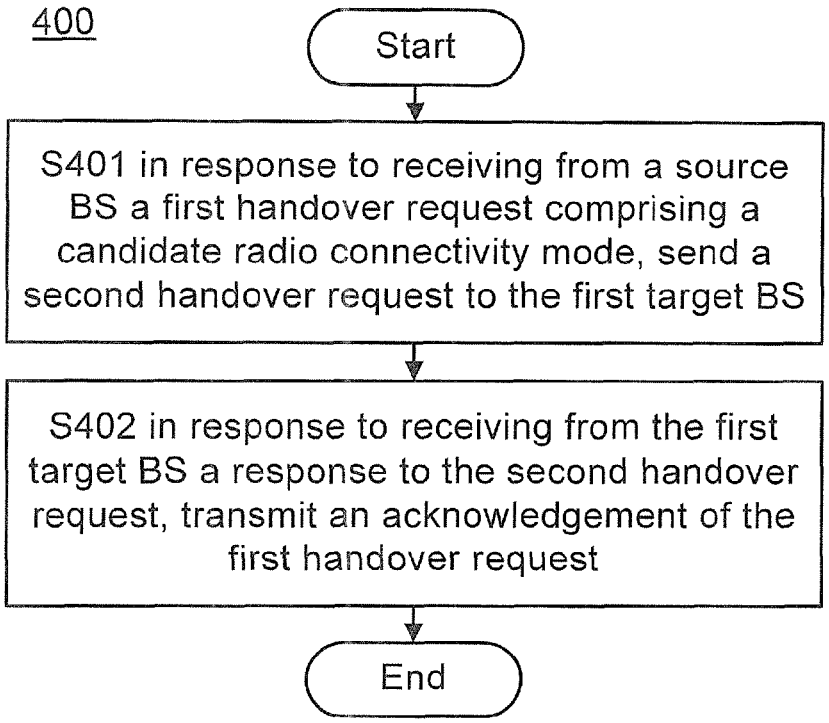
FIG. 4 illustrates a flow chart of a method 400 for handover a UE from a source BS to a first target BS and/or a second target BS in a heterogeneous network according to embodiments of the invention, wherein the method 400 may be performed at the second target BS.

Reference is now made to FIG. 4, which illustrates a flow chart of a method 400 for handover a UE from a source BS to a first target BS and/or a second target BS in a heterogeneous network according to embodiments of the invention, wherein the method 400 may be performed at the second target BS. According to embodiments of the present invention, the source BS is not associated with the first target BS, and the first target BS is a LPN and is associated with the second target BS. In accordance with embodiments of the present invention, the method 400 may be carried out by a second target BS, for example, a macro eNB.

At step S401, in response to receiving from a source BS a first handover request comprising a candidate radio connectivity mode, a second handover request is sent to the first target BS.

In accordance with embodiments of the present invention, upon receiving a first handover request from the source BS, the second target BS may extract the candidate radio connectivity mode from the first handover request, determine whether the candidate radio connectivity mode is applicable and send the second handover request to the first target BS if the candidate radio connectivity mode is applicable. The second handover request may comprise a local cell identifier of the first target BS. The local cell identifier may be used to route the handover request from second target BS to the first target BS.

At step S402, in response to receiving from the first target BS a response to the second handover request, an acknowledgement of the first handover request is transmitted.

According to embodiments of the present invention, when the first target BS receives the second handover request from the second target BS, it may perform radio resource configuration for preparation for handover of the UE. Thus, the UE configuration of the first target BS may be obtained according to the performed radio resource configuration. Then, the first target BS may send, to the second target BS, a response to the second handover request which comprises the UE configuration of the first target BS.

The second target BS, upon receiving the response to the second handover request, may obtain UE configuration of the first target BS from the response, perform radio resource configuration to obtain the UE configuration of the second target BS, and transmit an acknowledgement of the first handover request including UE configuration of the first target BS and/or UE configuration of the second target BS. In some embodiments, if the candidate radio connectivity mode, i.e., preference of the radio connectivity mode of the UE, is the single mode, either the UE configuration of the first target BS or the UE configuration of the second target BS may be included in the acknowledgement of the first handover request to notify the UE. In some other embodiments, if the candidate radio connectivity mode is the dual mode, both the UE configuration of the first target BS and the UE configuration of the second target BS may be included in the acknowledgement of the first handover request to notify the UE.

In accordance with embodiments of the present invention, if the first handover request is received from a source BS, the second target BS may transmit the acknowledgement of the first handover request to the source BS. In addition, if the first handover request is received from a source associated BS which is associated with the source BS (in this case, the source BS may be a LPN and the source associated BS may be a macro eNB), the second target BS may transmit the acknowledgement of the first handover request to the source associated BS, instead of transmitting to the source BS directly.

Figure 5:
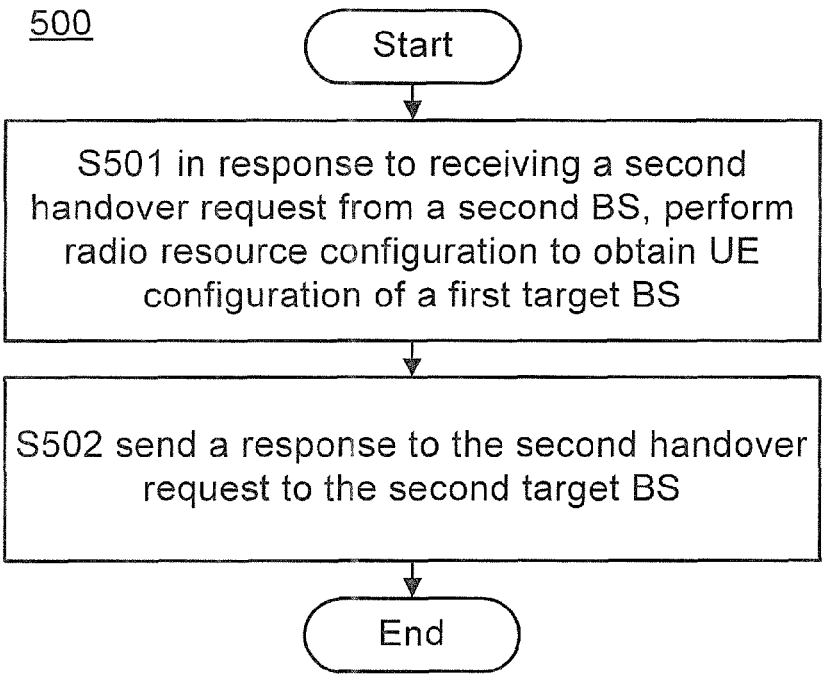
FIG. 5 illustrates a flow chart of a method 500 for handover a UE from a source BS to a first target BS and/or a second target BS in a heterogeneous network according to embodiments of the invention, wherein the method 500 may be performed at the first target BS.

Reference is now made to FIG. 5, which illustrates a flow chart of a method 500 for handover a UE from a source BS to a first target BS and/or a second target BS in a heterogeneous network according to embodiments of the invention, wherein the method 500 may be performed at the first target BS. According to embodiments of the present invention, the source BS is not associated with the first target BS, and the first target BS is a LPN and is associated with the second target BS. In accordance with embodiments of the present invention, the method 500 may be carried out by a first target BS, for example, a LPN, such as a pico eNB, a femto eNB, or a home BS which is associated with a macro eNB (e.g., controlled by the macro eNB). According to embodiments of the present invention, the first target BS may be controlled by the second target BS.

At step S501, in response to receiving a second handover request from a second BS, radio resource configuration is performed to obtain UE configuration of a first target BS.

At step S502, a response to the second handover request is sent to the second target BS, wherein the response to the second handover request comprises the UE configuration of the first target BS.

According to embodiments of the present invention, in response to receiving the response to the second handover request from the first target BS, the second target BS may perform step S401 and subsequently step S402 of method 400.

Figure 6:
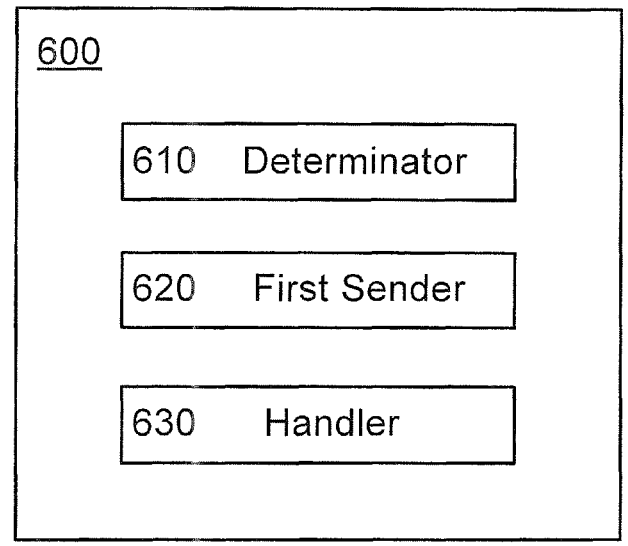
FIG. 6 illustrates a block diagram of an apparatus 600 for handover in a heterogeneous network according to embodiments of the invention.

Reference is now made to FIG. 6, which illustrates a block diagram of an apparatus 600 for handover in a heterogeneous network according to embodiments of the invention. According to embodiments of the present invention, the source BS is not associated with the first target BS, and the first target BS is a LPN and is associated with the second target BS. In accordance with embodiments of the present invention, the apparatus 600 may be implemented in, for example, for example, a UE, a terminal, a mobile station or similar devices.

According to embodiments of the present invention, the apparatus 600 may comprise a determinator 610 configured to determine a candidate radio connectivity mode for use after handover from a source BS to a first target BS and/or a second target BS; a first sender 620 configured to send to the source BS a handover request which comprises the candidate radio connectivity mode; and a handler 630 configured to, in response to receiving a handover related message, access the first target BS and/or the second target BS.

According to embodiments of the present invention, the first target BS may have a logical interface with the second target BS, and the source BS may not have a logical interface with the first target BS.

According to embodiments of the present invention, the determinator may comprise: a generating unit configured to generate, as the candidate radio connectivity mode, a preference on radio connectivity modes according to at least one of factors: power consumption information, UE mobility states, bandwidth requirements, local service needs and QoS requirements.

According to embodiments of the present invention, the candidate radio connectivity mode may be a single radio connectivity mode or a dual radio connectivity mode. According to embodiments of the present invention, the first target BS may be controlled by a second target BS, e.g., via association in the logical interface between the first target BS and the second target BS.

According to embodiments of the present invention, the handover request may further comprise a local cell identifier of the first target BS.

According to embodiments of the present invention, the handover related message may comprise: UE configuration of the first target BS; and/or UE configuration of the second target BS. According to embodiments of the present invention, the handover related message may be received from the source BS. According to embodiments of the present invention, the source BS is a LPN and the handover related message may be received from a source associated BS which is associated with the source BS.

Figure 7:
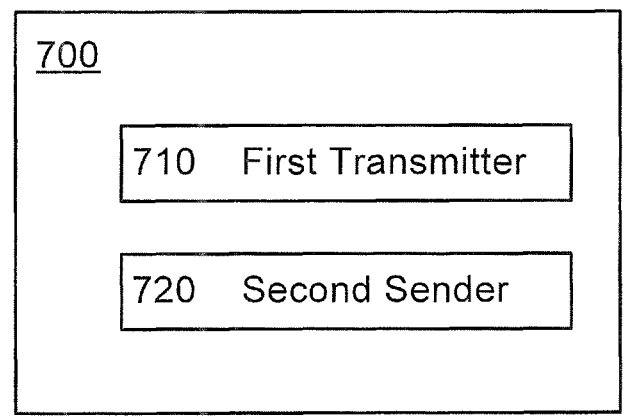
FIG. 7 illustrates a block diagram of an apparatus 700 for handover in a heterogeneous network according to embodiments of the invention.

Reference is now made to FIG. 7, which illustrates a block diagram of an apparatus 700 for handover in a heterogeneous network according to embodiments of the invention. According to embodiments of the present invention, the source BS is not associated with the first target BS, and the first target BS is a LPN and is associated with the second target BS. In accordance with embodiments of the present invention, the apparatus 700 may be implemented in a source BS. The source BS, in some embodiments, may be a macro eNB. In some other embodiments, the source BS may be a LPN, such as a pico eNB, a femto eNB, or a home BS which is associated with a macro eNB (e.g., controlled by the macro eNB).

According to embodiments of the present invention, the apparatus 700 may comprise a first transmitter 710 configured to, in response to receiving from a UE a handover request comprising a candidate radio connectivity mode, which is for use after handover from a source BS to a first target BS and/or a second target BS, transmit the handover request to the second target BS; and a second sender 720 configured to, in response to receiving an acknowledgement of the handover request, send a handover related message to the UE.

According to embodiments of the present invention, the handover related message comprises UE configuration of the first target BS and/or UE configuration of the second target BS. According to embodiments of the present invention, the handover related message is RRCConnectionReconfiguration.

According to embodiments of the present invention, the source BS is a LPN and the first transmitter 710 may comprises: a first transmitting unit configured to transmit the handover request to a source associated BS which is associated with the source BS, such that the source associated BS transmits the handover request to the second target BS.

Figure 8:
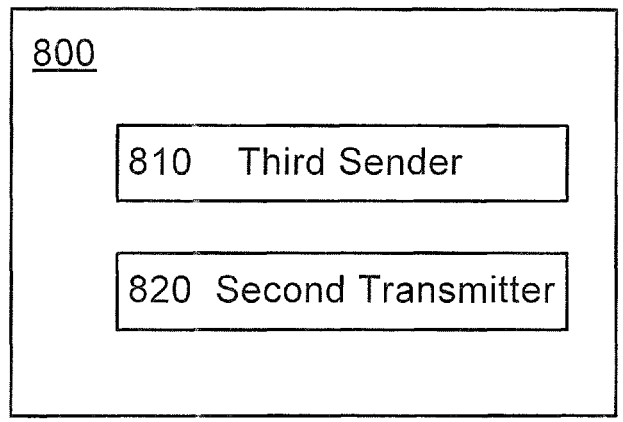
FIG. 8 illustrates a block diagram of an apparatus 800 for handover in a heterogeneous network according to embodiments of the invention.

Reference is now made to FIG. 8, which illustrates a block diagram of an apparatus 800 for handover in a heterogeneous network according to embodiments of the invention. According to embodiments of the present invention, the source BS is not associated with the first target BS, and the first target BS is a LPN and is associated with the second target BS. In accordance with embodiments of the present invention, the apparatus 800 may be implemented in a second target BS, for example, a macro eNB which may control the first target BS.

According to embodiments of the present invention, the apparatus 800 may comprise a third sender 810 configured to, in response to receiving a first handover request comprising a candidate radio connectivity mode, which is for use after handover from a source BS to a first target BS and/or a second target BS, send a second handover request to the first target BS; and a second transmitter 820 configured to, in response to receiving from the first target BS a response to the second handover request, transmit an acknowledgement of the first handover request.

According to embodiments of the present invention, the third sender 810 may comprise: an extracting unit configured to extract the candidate radio connectivity mode from the first handover request; a mode determining unit configured to determine whether the candidate radio connectivity mode is applicable; and a sending unit configured to, if the candidate radio connectivity mode is applicable, send the second handover request to the first target BS, wherein the second handover request comprises a local cell identifier of the first target BS, and wherein the local cell identifier is used to route the handover request from second target BS to the first target BS.

According to embodiments of the present invention, the second transmitter 820 may comprise: an obtaining unit configured to obtain UE configuration of the first target BS from the response; a performing unit configured to perform radio resource configuration to obtain the UE configuration of the second target BS; and a second transmitting unit configured to transmit an acknowledgement of the first handover request including UE configuration of the first target BS and/or UE configuration of the second target.

According to embodiments of the present invention, the second transmitting unit may comprise: a third transmitting unit configured to, if the first handover request is received from a source BS, transmit the acknowledgement of the first handover request to the source BS; and a fourth transmitting unit configured to, if the first handover request is received from a source associated BS, transmit the acknowledgement of the first handover request to the source associated BS, wherein the source associated BS is associated with the source BS.

Figure 9:
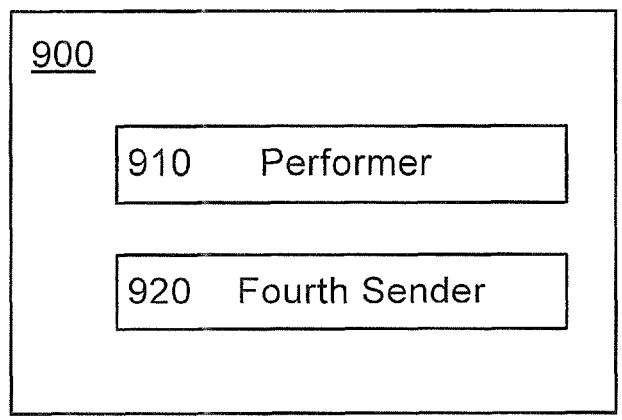
FIG. 9 illustrates a block diagram of an apparatus 900 for handover in a heterogeneous network according to embodiments of the invention.

Reference is now made to FIG. 9, which illustrates a block diagram of an apparatus 900 for handover in a heterogeneous network according to embodiments of the invention. According to embodiments of the present invention, the source BS is not associated with the first target BS, and the first target BS is a LPN and is associated with the second target BS. In accordance with embodiments of the present invention, the apparatus 900 may be implemented in a first target BS, for example, a LPN, such as a pico eNB, a femto eNB, or a home BS which is associated with the second target BS (e.g., controlled by the second target BS). According to embodiments of the present invention, the first target BS may be controlled by the second target BS.

According to embodiments of the present invention, the apparatus 900 may comprise: a performer 910 configured to, in response to receiving a second handover request from a second target BS, perform radio resource configuration to obtain UE configuration of a first target BS, wherein the second handover request is sent by the second target BS in response to receiving a first handover request which comprises a candidate radio connectivity mode for use after handover from a source BS to the first target BS and/or the second target BS; and a fourth sender 920 configured to send to the second target BS a response to the second handover request, wherein the response to the second handover request comprises the UE configuration of the first target BS.

It is noted that the apparatus 600 may be configured to implement functionalities as described with reference to FIG. 2, the apparatus 700 may be configured to implement functionalities as described with reference to FIG. 3, the apparatus 800 may be configured to implement functionalities as described with reference to FIG. 4, and the apparatus 900 may be configured to implement functionalities as described with reference to FIG. 5. Therefore, the features discussed with respect to any of method 200 may apply to the corresponding components of the apparatus 600, the features discussed with respect to any of method 300 may apply to the corresponding components of the apparatus 700, the features discussed with respect to any of method 400 may apply to the corresponding components of the apparatus 800, and the features discussed with respect to any of method 500 may apply to the corresponding components of the apparatus 900. It is further noted that the components of the apparatus 600, 700, 800 or 900 may be embodied in hardware, software, firmware, and/or any combination thereof. For example, the components of the apparatus 600, 700, 800 or 900 may be respectively implemented by a circuit, a processor or any other appropriate selection device. Those skilled in the art will appreciate that the aforesaid examples are only for illustration not limitation.

In some embodiment of the present disclosure, the apparatus 600, 700, 800 or 900 comprises at least one processor. The at least one processor suitable for use with embodiments of the present disclosure may include, by way of example, both general and special purpose processors already known or developed in the future. The apparatus 600, 700, 800 or 900 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 600, 700, 800 or 900 to at least perform according to methods as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 10A:
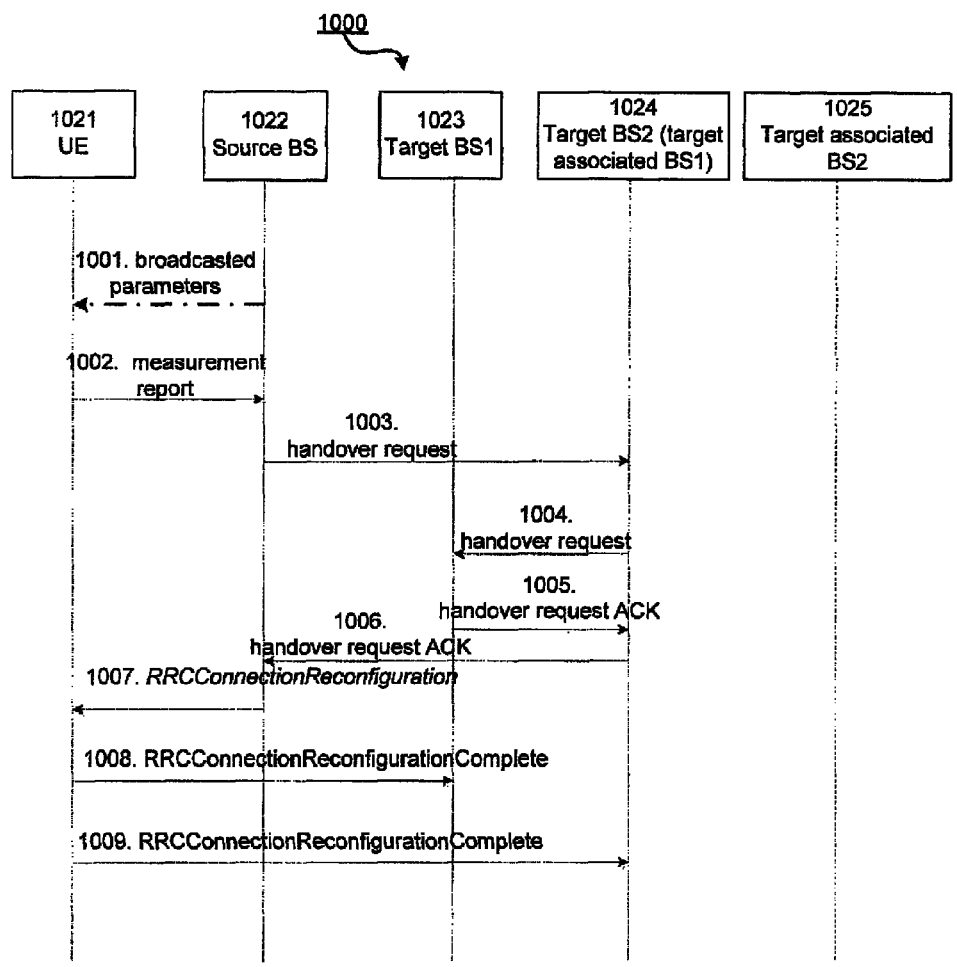
FIGS. 10A and 10B illustrate schematic diagrams 1000 for handover in a heterogeneous network according to some embodiments of the invention.
Figure 10B:
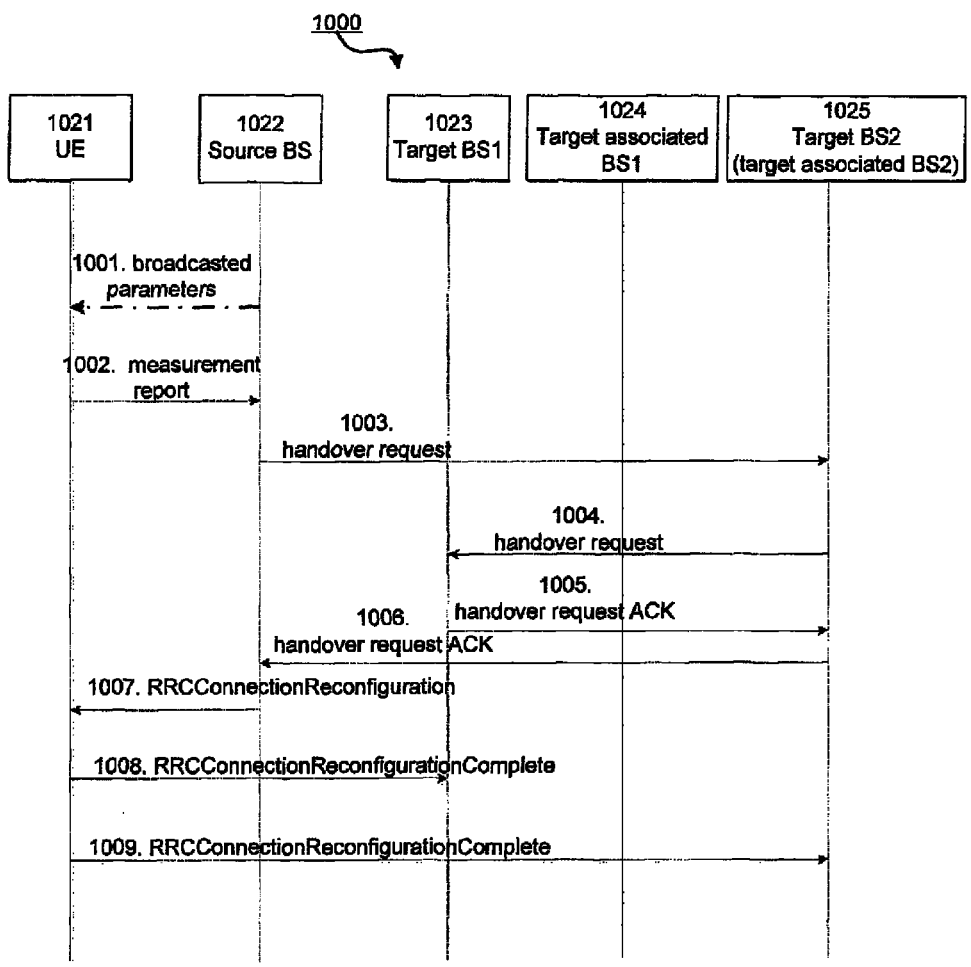

Reference is now made to FIGS. 10A and 10B, which illustrate schematic diagrams 1000 for handover in a heterogeneous network according to some embodiments of the invention. According to embodiments of the present invention, the source BS 1022 is not associated with the target BS1 1023, and the target BS1 1023 is a LPN and is associated with target associated BS1 1024 or target associated BS2 1025. As such, FIG. 10A illustrates the diagram for handover from the source BS 1022 to the target BS1 1023 and/or target associated BS1 1024, and FIG. 10B illustrates the diagram for handover from the source BS 1022 to the target BS1 1023 and/or target associated BS2 1025.

According to embodiments illustrated by FIG. 10A, the example procedure for a macro eNB to AP handover is provided, and UE 1021 is in single radio connectivity mode in source side and dual radio connectivity mode in target side. The source BS 1022 may be a macro eNB and serve the UE 1021, for example, broadcasting parameters to the UE 1021.

In accordance with the embodiments of the present invention, the UE 1021 may be an eLA-capable UE, which may discover target eLA AP and acquire, from parameters broadcasted 1001 by the source BS 1022, the eLA-specific parameters, such as target eLA cell's local cell identifier and associated eNB IDs. In this example, UE may acquire two target associated eNB's IDs, e.g., eNB ID 1 and eNB ID 2.

Supposing that the discovered macro cells with the broadcasted eNB IDs are prioritized during measurement. To this end, UE 1021 may indicate this to the Source BS 1022 via RRC signaling. The source BS 1022 then may support this by a measurement control message. The UE 1021 may send 1002 a handover related message to the source BS 1022, wherein the handover related message may comprise the target AP's local cell identifier, one or more identifiers of target associated BSs (e.g., eNB ID1 for target associated BS1 105, eNB ID2 for target associated BS2 106, etc.) as well as its preference in single/dual radio mode to the source macro/pico eNB.

Upon receiving the handover related message from the UE, the source BS 1022 may send 1003 a handover request, e.g. via extended X2 AP message, to target BS2 1024, which is a selected target associated eNB. The local cell identifier may be included to further route the handover related message to target eLA AP (i.e., target BS1 1023). The mode preference is also sent to target side.

Target BS2 1024 then sends 1004 a handover request to target BS1 1023, wherein the sending may be routed by using the local cell identifier.

The target BS1 1023, i.e., target eLA AP, may send 1005 a handover request ACK to target associated eNB. If eLA cell is prepared, the eLA configuration for the UE may be included.

The target BS2 1024 may send 1006 a handover request ACK to the source BS 1022. If dual radio mode is to be employed in target side, both UE configurations of macro and AP (UE configuration of the first target BS and UE configuration of the second target BS) may be delivered to UE 1021. In an exemplary embodiment, Macro and AP configurations may be provided in a second handover related message, e.g., RRCConnectionReconfiguration, and sent 1007 to the UE 1021 from the source BS 1022. Then, the UE 1022 may conduct RACH with eLA cell and macro cell.

As an alternative, if a single mode is to be employed in the target side, AP configuration (UE configuration of the first target BS) or Macro configuration (UE configuration of the second target BS) may be provided in RRCConnectionReconfiguration (i.e., a second handover related message) and sent 1007 to the UE 1021 from the source BS 1022. Then, the UE 1022 may conduct RACH with eLA cell or macro cell, rather than with both.

According to further embodiments of the present invention, a complete message, e.g., RRCConnectionReconfigurationComplete may be sent 1008 to target eLA AP and/or sent 1009 to target macro eNB. In some embodiments, if the dual mode is to be employed in target side, the UE may obtain both UE configuration of the first target BS and UE configuration of the second target BS, thus the UE may both send 1008 a complete message as a response to the first target BS (Target BS1 1023) and send 1009 a complete message as a response to the second target BS (Target BS2 1024). In some other embodiments, if the single mode is to be employed in target side, the UE may obtain either UE configuration of the first target BS or UE configuration of the second target BS, thus the UE may either send 1008 a complete message to the first target BS (Target BS1 1023) or send 1009 a complete message to the second target BS (Target BS2 1024).

As discussed with respect to FIG. 1B, both the target associated BS1 105 and the target associated BS2 106 are candidates for the second target BS. Actually, in practice, the second target BS may be the target associated BS2 106. In view of this, FIG. 10A discussed above shows the case that the target associated BS1 (labeled as 105 in FIG. 1B, and labeled as 1024 in FIG. 10A and FIG. 10B) is taken as the second target BS (i.e., target BS2), while FIG. 10B shows the case that the target associated BS2 (labeled as 106 in FIG. 1B, and labeled as 1025 in FIG. 10A and FIG. 10B) is taken as the second target BS.

Figure 11A:
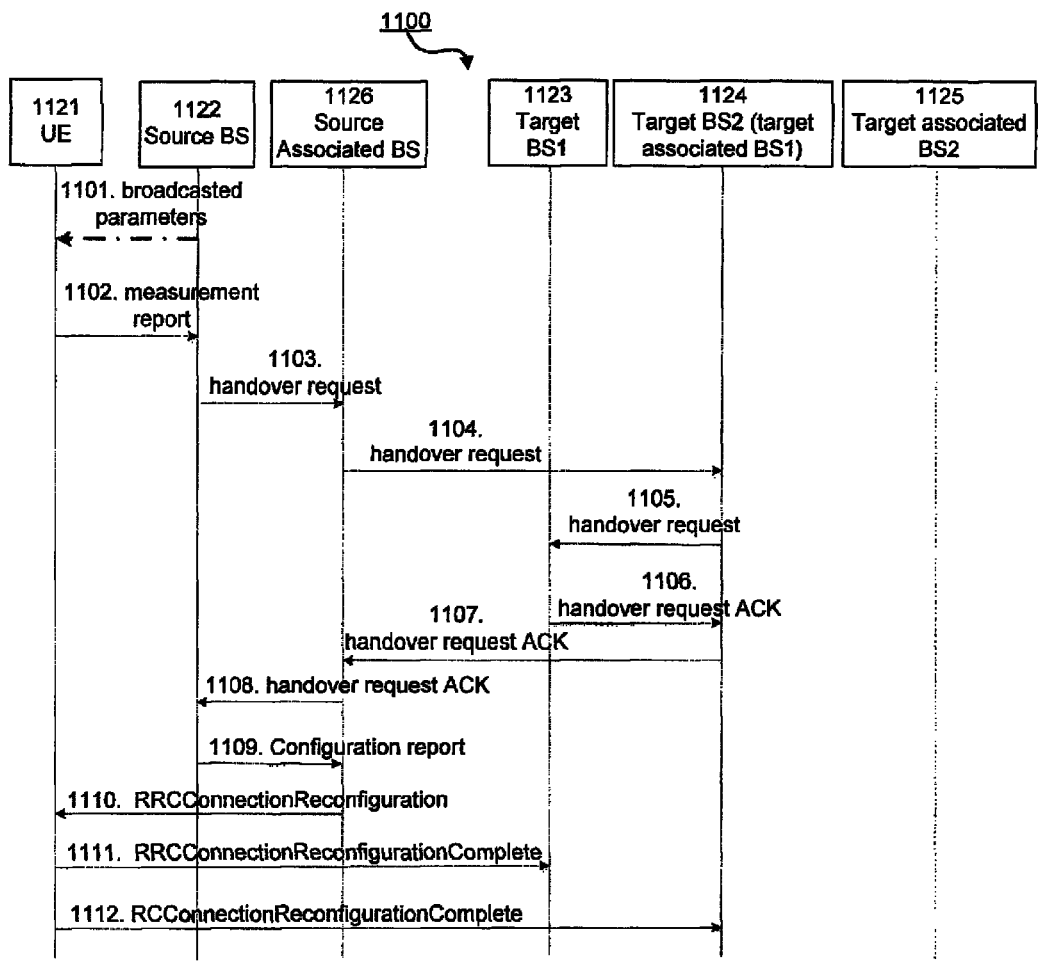
FIGS. 11A and 11B illustrates schematic diagrams 1100 for handover in a heterogeneous network according to some other embodiments of the invention.
Figure 11B:
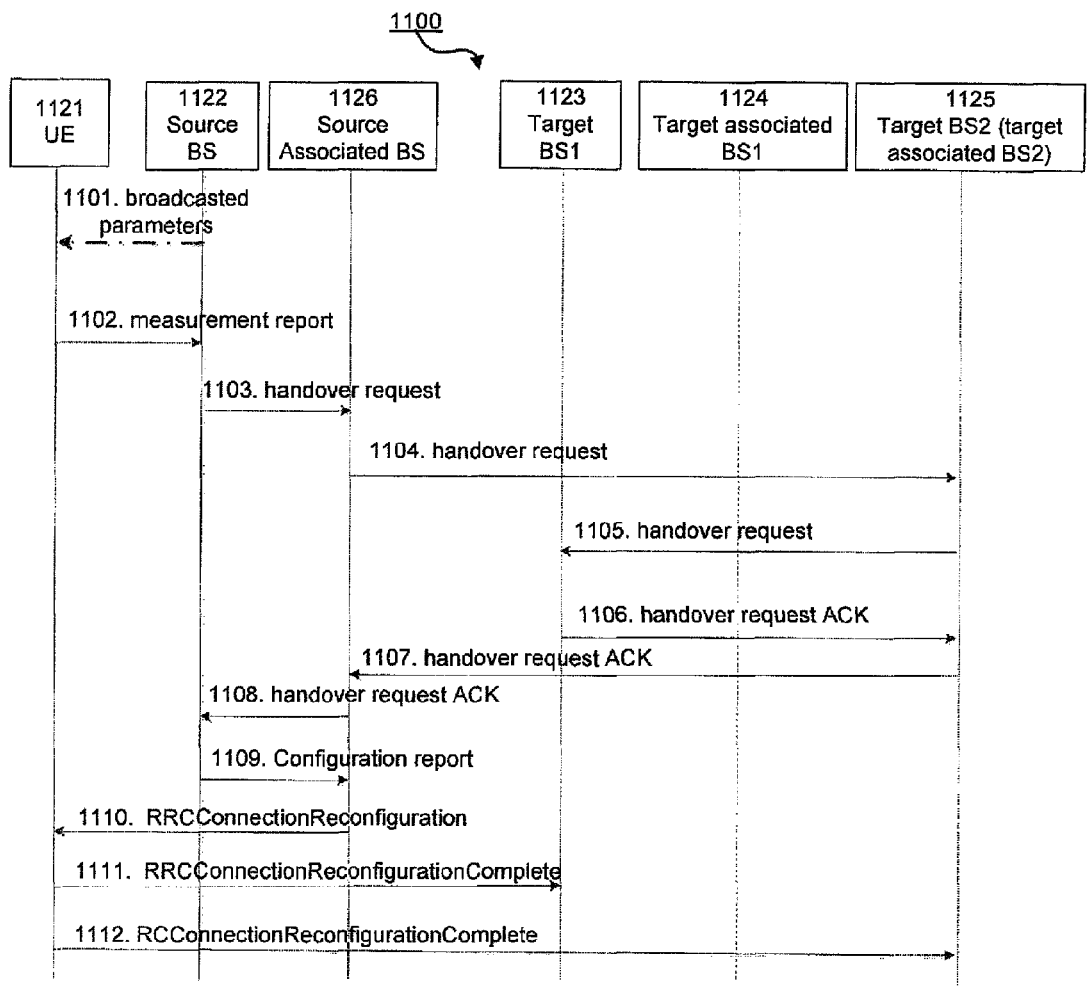

Reference is now made to FIGS. 11A and 11B, which illustrates schematic diagrams 1100 for handover in a heterogeneous network according to some other embodiments of the invention. According to embodiments of the present invention, the source BS 1122 is a LPN and is associated with a macro eNB (source associated BS 1126), the source BS 1122 is not associated with the target BS1 1123, and the target BS1 1123 is a LPN and is associated with the target BS2 1124 or target associated BS2 1125. As such, FIG. 11A illustrates the diagram for handover from the source BS 1122 to the target BS1 1123 and/or target associated BS1 1124, and FIG. 11B illustrates the diagram for handover from the source BS 1122 to the target BS1 1123 and/or target associated BS2 1125.

According to embodiments illustrated by FIG. 11A, the example procedure for AP to AP handover is provided, and UE 1121 is in dual radio connectivity mode in source side and dual radio connectivity mode in target side. The source BS 1122 may be a LPN, e.g., AP1 102 of FIG. 1B, and serve the UE 1121. The source BS may be associated with a macro eNB, i.e., source associated BS 1126.

An eLA-capable UE 1121 can discover target eLA AP and acquire, from parameters broadcasted 1101 from the source BS 1122, the eLA-specific parameters such as target eLA cell's local cell identifier and associated eNB IDs.

Supposing that the discovered macro cells with the broadcasted eNB IDs are prioritized during measurement. To realize this, UE can indicate the obtained eNB ID to Source eNB via RRC signaling. The source eNB can then support this by measurement control. The UE 1121 may send 1102 a handover related message to the source BS 1122, wherein the handover related message may comprise the target AP's local cell identifier, eNB ID1 and eNB ID2 as well as its preference in single/dual radio mode to the source macro/pico eNB.

Upon receiving the handover related message from the BS, the source BS 1022 may send 1103 a handover request to the source associated BS 1126, e.g., via S1' message. The preference information may be included in the message.

Via extended X2 AP message, source associated BS 1126 may send 1104 a handover request to the selected target associated eNB, e.g., target BS2 1124. The eNB ID may be used to select the target eNB. The local cell identifier is included to further route the handover request to target eLA AP. The mode preference is also sent to target side.

Target BS2 1124 may send 1105 a handover request to target BS1 1123, i.e., target eLA AP, routed by using the local cell identifier.

Target eLA AP (target BS1 1123) may send 1106 handover request ACK to target associated eNB. If eLA cell is prepared, the eLA configuration for the UE may be included.

Target associated eNB (target BS2 1124) may send 1107 the handover request ACK to source associated BS 1126, which is different from the flow illustrated in connection to FIGS. 10A and 10B due to the source BS 1122 is an eLA AP rather than a macro eNB. Then, the source associated BS 1126 sends 1108 a handover request ACK to the source BS 1122 and the source BS 1122 may send 1109 a configuration report to the source associated BS 1126. Next, the source associated BS 1126 send 1110 a message (such as RRCConnectionReconfiguration) to the UE 1121, which comprises UE configuration of the first target BS and/or UE configuration of the second target BS, depending on different radio connectivity mode (single or dual) employed at the target side.

According to further embodiments of the present invention, a complete message, e.g., RRCConnectionReconfigurationComplete may be sent 1111 to target eLA AP (target BS 1123) and/or sent 1112 to target macro eNB (e.g., target associated BS1 1124), as a response to receiving UE configuration of the first target BS and/or UE configuration of the second target BS.

As discussed with respect to FIG. 1B, both the target associated BS1 105 and the target associated BS2 106 are candidates for the second target BS. Actually, in practice, the second target BS may be the target associated BS2 106. In view of this, FIG. 11A discussed above shows the case that the target associated BS1 (labeled as 105 in FIG. 1B, and labeled as 1124 in FIG. 11A and FIG. 11B) is taken as the second target BS (i.e., target BS2), while FIG. 11B shows the case that the target associated BS2 (labeled as 106 in FIG. 1B, and labeled as 1125 in FIG. 11A and FIG. 11B) is taken as the second target BS.

According to embodiments of the present invention, handover from an eNB to an unassociated AP may be supported, load balancing among associated eNBs is obtained which contributes to reduce UP concentrator capacity, and unnecessary and separated inter-eNB intra-AP handover may be avoided.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method, comprising:
   determining a candidate radio connectivity mode for use after handover from a source base station (BS) to at least one of a first target BS and a second target BS;
   sending to the source BS a first handover related message which comprises the candidate radio connectivity mode; and
   in response to receiving a second handover related message, accessing at least one of the first target BS and the second target BS,
   wherein the source BS is not associated with the first target BS, and
   wherein the first target BS is a low power node (LPN) and is associated with the second target BS, and
   wherein the candidate radio connectivity mode is a single radio connectivity mode or a dual radio connectivity mode.

2. The method as recited in claim 1, wherein the first target BS has a logical interface with the second target BS, and the source BS does not have a logical interface with the first target BS.

3. The method as recited in claim 1, wherein determining a candidate radio connectivity mode comprises:
   generating, as the candidate radio connectivity mode, a preference on radio connectivity modes according to at least one of factors: power consumption information, UE mobility states, bandwidth requirements, local service needs and Quality of Service (QoS) requirements.

4. The method as recited in claim 1, wherein the first target BS is controlled by a second target BS via association in the logical interface between the first target BS and the second target BS.

5. The method as recited in claim 1, wherein the first handover related message further comprises a local cell identifier of the first target BS.

6. The method as recited in claim 1, wherein the second handover related message comprises at least one of:
   UE configuration of the first target BS; and
   UE configuration of the second target BS.

7. The method as recited in claim 1, wherein the second handover related message is received from the source BS.

8. The method as recited in claim 1, wherein the source BS is a LPN and the second handover related message is received from a source associated BS which is associated with the source BS.

9. An apparatus, comprising:
   at least one processor; and
   at least one memory including computer program instructions, wherein the at least one processor, based on the computer program instructions, is configured to cause the apparatus at least to:
   determine a candidate radio connectivity mode for use after handover from a source base station (BS) to at least one of a first target BS and a second target BS;
   send to the source BS a first handover message which comprises the candidate radio connectivity mode; and
   in response to receiving a second handover related message from the source BS, access at least one of the first target BS and the second target BS, wherein the source BS is not associated with the first target BS, and
   wherein the first target BS is a low power node (LPN) and is associated with the second target BS, and
   wherein the candidate radio connectivity mode is a single radio connectivity mode or a dual radio connectivity mode.

10. The apparatus as recited in claim 9, wherein the first target BS has a logical interface with the second target BS, and the source BS does not have a logical interface with the first target BS.

11. The apparatus as recited in claim 9, wherein the determining the candidate radio connectivity mode comprises:
    generating, as the candidate radio connectivity mode, a preference on radio connectivity modes according to at least one of factors: power consumption information, UE mobility states, bandwidth requirements, local service needs and Quality of Service (QoS) requirements.

12. The apparatus as recited in claim 9, wherein the first target BS is controlled by a second target BS via association between the first target BS and the second target BS.

13. The apparatus as recited in claim 9, wherein the first handover related message further comprises a local cell identifier of the first target BS.

14. The apparatus as recited in claim 9, wherein the second handover related message comprises at least one of:
    UE configuration of the first target BS; and
    UE configuration of the second target BS.

15. The apparatus as recited in claim 9, wherein the source BS is a LPN and the second handover related message is received from a source associated BS which is associated with the source BS.

16. An apparatus, comprising:
    at least one processor; and
    at least one memory including computer program instructions, wherein the at least one processor, based on the computer program instructions, is configured to cause the apparatus at least to:
    in response to receiving from a use equipment (UE) a first handover related message comprising a candidate radio connectivity mode, which is for use after handover from a source base station (BS) to at least one of a first target BS and a second target BS, transmit the handover request to the second target BS; and
    in response to receiving an acknowledgement of the handover request, send a second handover related message to the UE, wherein the source BS is not associated with the first target BS, and
    wherein the first target BS is a low power node (LPN) and is associated with the second target BS, and wherein the candidate radio connectivity mode is a single radio connectivity mode or a dual radio connectivity mode.

17. The apparatus as recited in claim 16, wherein the second handover related message comprises at least one of UE configuration of the first target BS and UE configuration of the second target BS, and wherein the handover related message is RRCConnectionReconfiguration.

18. The apparatus as recited in claim 16, wherein the source BS is a LPN and the transmitting the handover request comprises:
   transmitting the handover request to a source associated BS which is associated with the source BS, such that the source associated BS transmits the handover request to the second target BS.

* * * * *